E. C. AUSTIN.

Tools for Cutting Rope-Moldings

No. 6,170. Reissued Dec. 15, 1874.

Witnesses:
N. H. Sherburne
Thomas J. Burke

Inventor
Edwin C. Austin
by Sherburne & Co.
Attorneys.

THE GRAPHIC CO. PHOTO-LITH. 39 & 41 PARK PLACE, N.Y.

UNITED STATES PATENT OFFICE.

EDWIN C. AUSTIN, OF CHICAGO, ILLINOIS, ASSIGNOR OF ONE-HALF INTEREST TO ANDREW P. BOYNTON.

IMPROVEMENT IN TOOLS FOR CUTTING ROPE-MOLDING.

Specification forming part of Letters Patent No. 61,306, dated January 22, 1867; reissue No. 6,170, dated December 15, 1874; application filed June 22, 1874.

*To all whom it may concern:*

Be it known that I, EDWIN C. AUSTIN, formerly of the village of Monroe, in the county of Green and State of Wisconsin, but now of Chicago, in the county of Cook and State of Illinois, have invented an Improvement in Tools for Cutting Rope-Moldings; and I do hereby declare the following to be a full, clear, and exact description thereof, which will enable others skilled in the art to which my invention appertains to make and use the same, reference being had to the accompanying drawings, forming part of this specification, in which—

Figure 1:
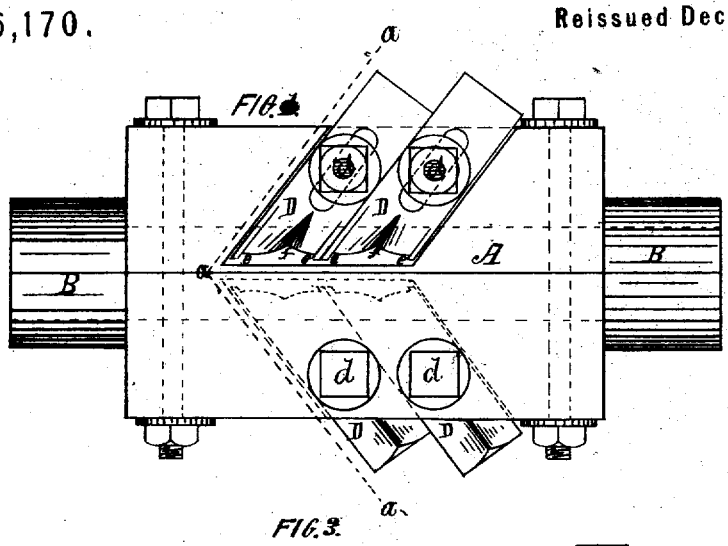
Figure 4:
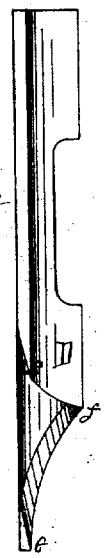
Figure 3:
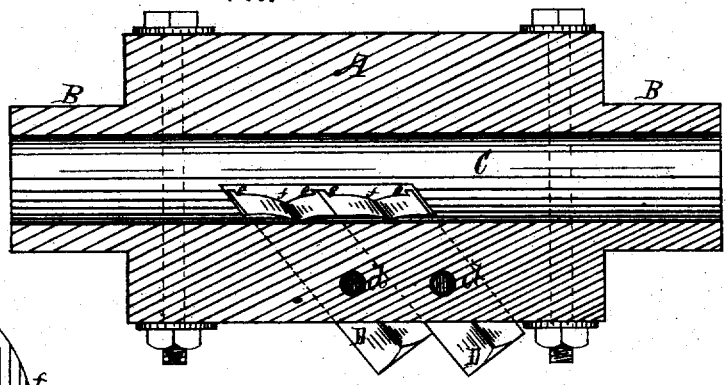
Figure 5:
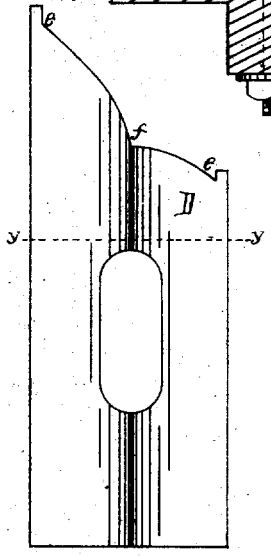
Figure 2:
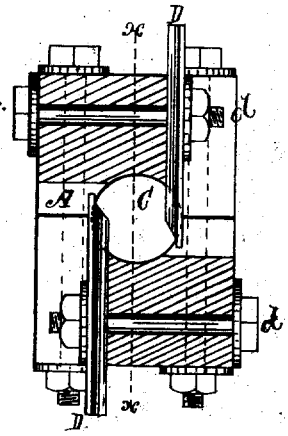
Figure 6:
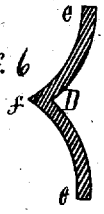

Figure 1 is a side elevation of the molding-tool proper detached from its bearings. Fig. 2 is a transverse section of the same, taken on the line *a a*, drawn across Fig. 1. Fig. 3 is a longitudinal section, taken on the line *x x*, drawn through Fig. 2. Fig. 4 is an enlarged edge view of one of the cutters detached. Fig. 5 is a face view of the same; and Fig. 6 is a transverse section, taken on the line *y y*, drawn across Fig. 5.

Similar letters of reference indicate like parts in the several figures of the drawing.

The object of my invention is to provide a tool for the manufacture of what is known as spiral or rope molding; and, to that end, it consists in a hollow mandrel, through which the molding-blank is passed, and to which is secured a series of cutters of the desired form of molding, and arranged to bring the line of cut at an obtuse angle to the diameter of the blank, whereby a spiral molding is formed around the blank by the rotation of the latter, as hereinafter described.

It further consists, in combination with the hollow mandrel, of the cutters provided with receding edges, so arranged that the advance portion of the edge shall first engage the molding-blank at its periphery, whereby a smooth cut against the grain of the wood is obtained, as will be hereinafter more fully described.

In the drawing, A represents the mandrel, which is substantially made of wood or metal, as may be preferred. This mandrel is usually from six to eight inches in length; and, when made of wood, it is constructed in two parts, and firmly bolted together, as shown in Figs. 1, 2, and 3. This mandrel is also provided with an annular cavity, C, extending longitudinally through the same, the diameter of which is slightly greater than the diameter of the blank to be cut. Attached to the sides of the mandrel is a series of cutters, D, the cutting-edges of which extend inward, through the shell, into the cavity. These cutters are constructed as shown, and so attached as to admit of being moved in the direction of their length, and firmly secured at the requisite adjusted point by means of the bolt *d*, the object of which is to determine the depth of cut. They have a curvilinear form, in the direction of their thickness, of the curvature of the members of the molding to be cut, and are so arranged as to bring the line of cut at an obtuse angle to the diameter of the molding-blank; or, in other words, are arranged in a line with the pitch of the molding to be formed, by which means the path of the cutters will be spirally around the molding-blank as the mandrel is rotated. The cutting-edges of the cutters regularly recede from the points *e* to the point *f*, so as to bring the plane of the edge at an obtuse angle to the face of the cutter, the object of which is to cause the advance points to first come in contact with the blank at its periphery, and in advance of the receding edge, so that the cutting will be downward and first at the advance points of the cutters, thus preventing the blank from splitting, and insuring a smooth cut across the grain of the wood. The width of the separate cutters is equal to the gross width of the members forming the molding, and their relative positions on the mandrel is such that the path of the rear cutter is parallel with the advance cutter, and at the proper distance therefrom to form its separate moldings.

In using my invention, the molding-blank is first rounded and reduced to the proper size to freely pass through the cavity in the mandrel by means of any known machinery. The end of the blank is then introduced into the cavity in the mandrel, and, by the rotation of the latter, the cutting-edges are brought in contact with the circumference of the blank, and by the angle of the cutters the depending surfaces of the same take into, and are caused to follow in, the furrow or path of the cutters, thus forming a spiral molding of uniform width around the blank, causing the latter to move in the direction of its length through the cavity, completing the molding by once passing through the tool.

Having thus described my invention, I claim—

The curvilineal cutters D, arranged at an obtuse angle to the diameter of the molding-blank, and adapted to form separate paths around the same, in combination with the hollow mandrel A, made smooth on its inner surface whereby the blank is drawn through the mandrel by the friction of the cutters, as specified.

EDWIN C. AUSTIN.

Witnesses:

THOMAS J. BURKE,

N. H. SHERBURNE.